United States Patent
Baldwin et al.

(10) Patent No.: US 11,046,483 B2
(45) Date of Patent: Jun. 29, 2021

(54) COATED HOT DRINK CUP

(71) Applicant: Specialty Coating & Laminating, LLC, Doswell, VA (US)

(72) Inventors: Geoffrey M. Baldwin, Mechanicsville, VA (US); Joshua A. Elliott, Henrico, VA (US)

(73) Assignee: Specialty Coating & Laminating, LLC, Doswell, VA (US)

(*) Notice: Subject to any disclaimer, the term of this patent is extended or adjusted under 35 U.S.C. 154(b) by 0 days.

(21) Appl. No.: 16/599,614

(22) Filed: Oct. 11, 2019

(65) Prior Publication Data

US 2021/0107702 A1   Apr. 15, 2021

(51) Int. Cl.
| | |
|---|---|
| *B65D 25/14* | (2006.01) |
| *B65D 65/42* | (2006.01) |
| *B65D 3/06* | (2006.01) |
| *B29L 31/00* | (2006.01) |

(52) U.S. Cl.
CPC ............ *B65D 25/14* (2013.01); *B65D 3/06* (2013.01); *B65D 65/42* (2013.01); *B29L 2031/7132* (2013.01); *B32B 2250/03* (2013.01)

(58) Field of Classification Search
CPC .......... B65D 25/14; B65D 3/06; B65D 65/42; B65D 25/36; B65D 81/3874; B65D 1/265; B65D 5/563; B29L 2031/7132; C09D 125/08; D21H 19/20; B31B 2110/10; D21J 3/00; B32B 2250/03; B32B 2255/12; B32B 2260/028; Y02W 30/80; Y02W 90/10

USPC .......... 229/400, 403, 4.5, 103.11; 220/62.12, 220/703, 592.2, 592.25
See application file for complete search history.

(56) References Cited

U.S. PATENT DOCUMENTS

| | | | | |
|---|---|---|---|---|
| 5,542,599 | A * | 8/1996 | Sobol .................. | A47J 41/0077 229/103.11 |
| 6,379,497 | B1 * | 4/2002 | Sandstrom ............. | B65D 1/265 162/123 |
| 7,080,753 | B1 * | 7/2006 | Miller ................ | A47G 23/0216 220/666 |
| 7,828,199 | B2 * | 11/2010 | Robertson .......... | B65D 81/3874 220/592.2 |
| 2017/0166372 | A1 | 6/2017 | Bugas | |
| 2017/0217654 | A1 | 8/2017 | Harmon | |
| 2018/0022502 | A1 | 1/2018 | Bugas et al. | |

* cited by examiner

*Primary Examiner* — Christopher R Demeree
(74) *Attorney, Agent, or Firm* — John H. Thomas, P.C.

(57) ABSTRACT

A cup or food container has a coating formed of a styrene acrylic copolymer emulsion. There may be one or more coating layers on the inside surface of the cup or container. Importantly, the cup or container does not have any petroleum-based paraffin or polymer material or functionally similar hydrogenated triglyceride material coated on or incorporated in the cup or container. The paper substrate onto which the styrene acrylic copolymer emulsion is coated must have adequate sizing incorporated therein so that the coating forms a relatively smooth surface. Differently-sourced paper may require different amounts of sizing according to the particular paper being used. The cup or container may have a primer coating applied thereto before the styrene acrylic copolymer is coated on. Optionally, the uncoated paper stock that forms the cup or food container is calendared between rolls before coating.

14 Claims, 4 Drawing Sheets

COATED HOT DRINK CUP

The present invention is directed to a repulpable, recyclable and compostable hot drink cup. Specifically, a paper cup is coated with a styrene acrylic copolymer emulsion to impart water sealing properties to the cup.

BACKGROUND

At present, many hot drink cups and food containers are formed of expanded polystyrene or polyethylene (PE) coated virgin paper. While these cups and containers may have favorable performance benefits during use, their disposal creates landfill and trash issues. Expanded polystyrene cups and PE coated paper cups are simply not biodegradable. Expanded polystyrene cups are well known to not be biodegradable or recyclable. The same is true for PE coated paper cups. The PE coated paper cups are not accepted back into most paper mills as an acceptable feed stock for recycling, because the PE coating does not break down and must be screen or filtered out of the feed stock essentially completely so that PE contaminates do not get left behind in the paper. The commercial market is looking for paper-based products to effectively use and yet still be able to be heat sealable with excellent hot liquid hold out properties and that are recyclable or repulpable.

Petroleum based products including synthetic polymers have been used for many years as a coating for cups and food packages in order to impart moisture resistance and water repellant properties to the cup or container. Unfortunately, the paper which has been coated with these known coatings are difficult and to repulp and recycle in standard paper mill processes. These petroleum derived polymers are non-biodegradable in a traditional paper mill process. The residue of these petroleum polymers that is not removed in the recycling or repulping processes may cause severe problems resulting from the buildup that occurs during the process of manufacturing paper sheet. Additionally, cups and containers coated with petroleum-based polymers may resist biodegradation and composting if disposed of in a landfill or other waste disposal systems. Furthermore, the resistance of these petroleum polymers in their separation from fiber during repulping results in fiber losses during the repulping process at the few mills that attempt using it. Therefore, the only way to reasonably repulp or reprocess paper products coated with existing petroleum-based products requires specialized equipment. And because these special processes are expensive and do not screen or filter essentially 100% of the petroleum based products, the resulting products are not up to commercially acceptable repulped materials standards for most grades of paper. Unfortunately, existing coatings that are repulpable on paper cups simply cannot and do not provide water hold out properties required for use in hot drinks.

SUMMARY

Accordingly, it is an object of the present invention to overcome the shortcomings of existing hot drink cup and food container challenges. The use of a styrene acrylic composition in one or more coats on a paper substrate have been discovered to have favorable moisture resistance and heat sealability and yet still be favorably repulpable and recyclable.

In one example, a repulpable, moisture resistant hot drink cup comprises a paper cup comprising a paper bottom and a paper sidewall and having an inside surface of the cup defined by an inside surface of the bottom and an inside surface of the sidewall. The sidewall is impregnated with sizing in an amount that the 30-minute Cobb value of the uncoated paper cup is about 400 gm/m2 or less, and wherein the inside surface of the cup is coated with an emulsified mixture of styrene acrylic copolymer to provide a moisture resistance to the inside of the paper cup. Alternatively, the sidewall are impregnated with sizing in an amount that the 10-minute Cobb value of the uncoated paper cup is about 200 gm/m2 or less, or about 100 gm/m2 or less. The solids content of the styrene acrylic copolymer emulsion may be about 30% to 70%, or about 45% to 55%, or still further about 50%. The coated cup may have a 10-minute Cobb value of about 5 gm/m2 or less, or about 4 gm/m2 or less, or still further about 3 gm/m2 or less. The hot drink cup may further comprise a primer coating on the inside surface between the inside surface of the cup and the styrene acrylic copolymer coating layer, and wherein the primer coating is an ethylene vinyl alcohol. The styrene acrylic copolymer may have a Tg of −10 to 40 degrees, or 0 to 10 degrees, or still further about 7 degrees.

DETAILED DESCRIPTION

Figure 1:
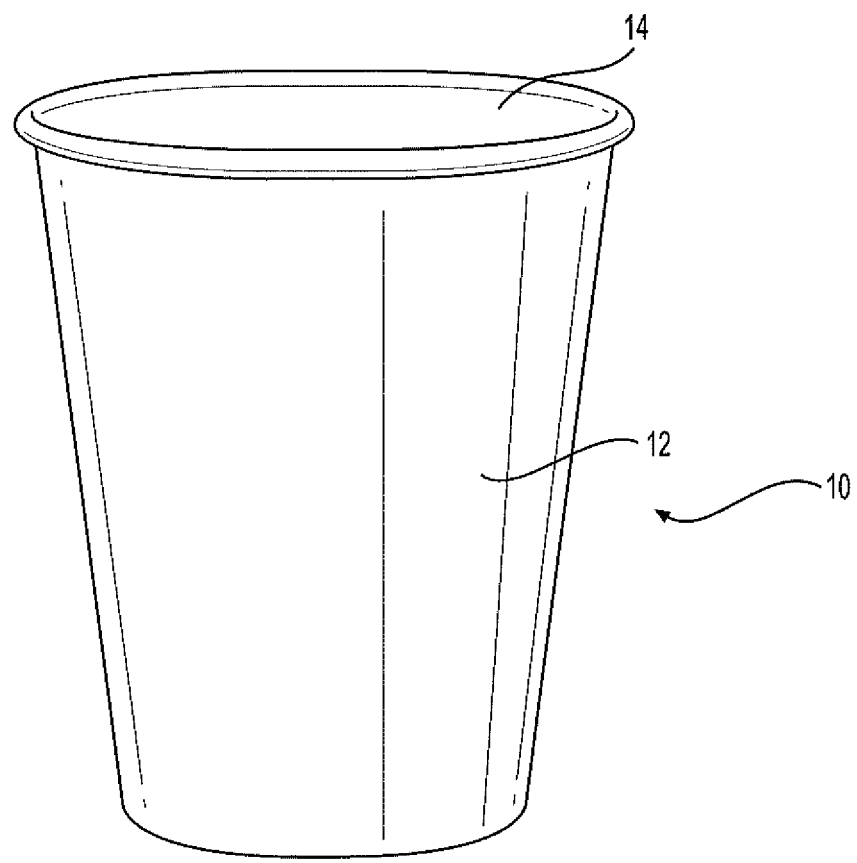
FIG. 1 is a perspective view of a hot drink paper cup.

The cup or food container described herein has a coating formed of a styrene acrylic copolymer emulsion. There may be one or more coating layers on the inside surface of the cup or container to obtain both liquid holdout properties and heat sealability. Importantly, the cup or container does not have any petroleum-based paraffin or polymer material or functionally similar hydrogenated triglyceride material coated on or incorporated in the cup or container. Also, the styrene acrylic copolymer coating is able to impart liquid holdout properties at a much lower coating weight. This means significantly less amount of polymer in the reclaimed fiber. In one example, the amount of styrene acrylic copolymer by mass is only about 20% of the mass of an equivalent polyethylene coating for a hot drink cup. The paper substrate onto which the styrene acrylic copolymer emulsion is coated must have adequate sizing incorporated therein so that the coating forms a relatively smooth surface. Differently-sourced paper may require different amounts of sizing according to the particular paper being used. The cup or container may have a primer coating applied thereto before the styrene acrylic copolymer is coated on. This primer can be, but is not limited to, an polyvinyl alcohol material. The use of a primer coat or alternatively the use of multiple styrene acrylic copolymer coats depends on the quality of the paper substrate and the desired functionality of the cup or container. For the ease of discussion, the example of a hot drink cup is used throughout. The invention may be used with paper food containers more generally.

The paper cup begins with the paper that is used to form the component parts—the paper bottom and the paper sidewall. As a normal aspect of the manufacture of the paper, the raw pulp includes sizing to improve the absorption properties of the manufactured paper—that is, the addition of sizing reduces the amount of water and moisture absorbed by the paper. Sizing is incorporated in the paper stock either internally during manufacture or later, externally after the paper web is formed or at both times. It may be coated onto the paper during the coating processes described herein, but it is expected that the sizing is already incorporated into the paper stock before the coating processes herein. The amount of sizing will depend on the end use for the paper and on the quality and type of fibers that form the paper. Virgin wood pulp has different, and typically superior, absorption characteristics versus fully or partially recycled or 100% recycled fibers. A paper cup will use paper having a thickness 8 mils to 30 mils. While the amount of sizing may vary, it is desired that the paper used to form a hot drink cup will have absorption characteristics as measured by the 30-minute Cobb value of 400 gm/m2 or less, or alternatively about 200 or less, or still further about 100 or less. Qualitatively speaking, the lower the Cobb value, the better the moisture resistance.

The next component is the styrene acrylic copolymer coating used on the paper cup. Traditionally, this coating layer is applied solely to the inside surface of the bottom and sidewall of the cup. The outside surface of the cup that is held by a user is paper typically without any coating, although there can and often is some sort of printing applied on the outside surface. As with the sizing, the amount of styrene acrylic copolymer composition applied will depend on the quality of the paper. The amount used is calculated based on the final 10-minute Cobb value of the coated cup. After the cup is coated, then the 10-minute Cobb value is 5 gm/m2 or less, or alternatively about 4 or less, or still further alternatively about 3 or less.

It may also be advantageous to apply the coating described herein to a very smooth surface to reduce the amount of coating that is needed to improve the desired properties at a lower coat weight. Paper naturally has a rough surface, at least on a small scale, where fibers that protrude from the paper web may wick moisture into the paper. Different types of paper from different sources can have varying degrees of roughness, and therefore, moisture resistance or not. More coating material is required to make a rough paper surface smooth enough to be a good resistant layer against water and moisture. In one optional alternative, an acceptable smooth surface can be obtained using an in-line process of preparing and calendaring the paper using external heated polymer rolls against metal rollers in order to make an extremely smooth paper on at least one side of the paper. This smooth-sided paper is not commercially available for purchase for the paper stock used to make cups. Specifically, the in-line process of smoothing at least one surface of the paper is undertaken by using a calendaring process where the sourced paper product is run between nip rollers to compress at least the outside of the paper substrate. The nip rollers may be both metal (typically steel) rollers. Alternatively, one or both of the rollers may be resilient rollers where the metal roller is coated or covered with a polymer outside surface. The rollers are heated so that the outside surface of the rollers is between about room temperature and 400 degrees F., or alternatively about 200 to 350 degrees F., or still further alternatively between about 275 to 325 degrees F. The pressure applied to the substrate paper is 300 or more pounds per linear inch (pli), or 500 or more ph, or still further alternatively, 800 or more pli, or in one example, about 1000 pli. In grossly general terms, the more heat that is applied to the paper substrate, the less pressure is needed to smooth at least one surface of the substrate. The end smoothness of at least one of the paper substrate surfaces is measured in Sheffield units, with the smooth side being about 400 units or less, or alternatively about 250 units or less, or still further alternatively, about 200 units or less. The actual process may include the application of moisture on the surface of the paper substrate right before it passes through the nip rollers. This is a light amount of moisture that is only enough to soften the top surface of the paper fibers before compression. The moisture can enhance smoothing by maximizing smoothness and reducing the gain in density of the smoothed paper.

In order to facilitate the superior coating of the paper, the styrene acrylic copolymer emulsion coating material has a solids content of about 30% to 70%, or alternatively about 45% to 55%, or still further alternatively about 50%. This solids content facilitates a smooth and uniform coating with minimal unevenness.

The styrene acrylic copolymer is specifically any acrylic copolymer that is heat sealable and also with high heat temperature resistance. Another possible coating is styrene butadiene copolymer. In one commercial example, the styrene acrylic copolymer is referred to as M-Cote-LC. The amount of coating applied is 1 dry lb per 1,000 ft2 to 4 dry lbs per 1,000 ft2.

As noted earlier, some paper may require one or more primer coatings and/or two or more coating layers of styrene acrylic copolymer emulsion. Suitable primers include polyvinyl alcohol, ethylene vinyl alcohol, polyurethane and ethylene acrylic acid among others. The primer may or may not include fillers such as clay or calcium compounds. When smoothed through the calendaring process, it is expected that the paper surface does not require a primer coating or even multiple coatings with the styrene acrylic copolymer.

Turning now to the figures, FIG. 1 is a simple perspective view of a hot drink paper cup 10 where the paper cup has an outside surface 12 and an inside surface 14. The inside surface 14 is coated so that hot liquids poured into the cup do not soak through the paper cup, or at the very least, do not soak into the cup too quickly to render the cup unusable. The outside surface 12 of the cup 10 may also optionally be coated to provide an additional layer of moisture protection. Outside surface coating is typical for cold drink cups to seal out expected condensation during use. However, it is typical for the outside surface 12 to be uncoated for hot drink cups.

Figure 2:
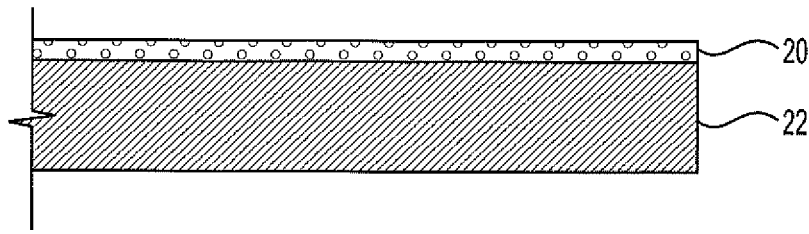
FIG. 2 is a side, cross-sectional view of a wall of a paper cup showing a single coating layer of styrene acrylic copolymer.

FIG. 2 is a side, cross-sectional view of a paper sidewall or bottom where the paper substrate 22 has a single coating of styrene acrylic copolymer 20 as described herein. This paper substrate 22 has a relatively smooth surface, so only one coating 20 is sufficient to seal the surface and protect the paper from liquid ingress. In one example of a smooth surface paper substrate 22, there can be used an SBS, or, solid bleached sulfate, paper that is recognized as a thick white paperboard made from chemically bleached pulp. Other papers having smooth surfaces may alternatively be used that require only a single coating layer.

Figure 3:
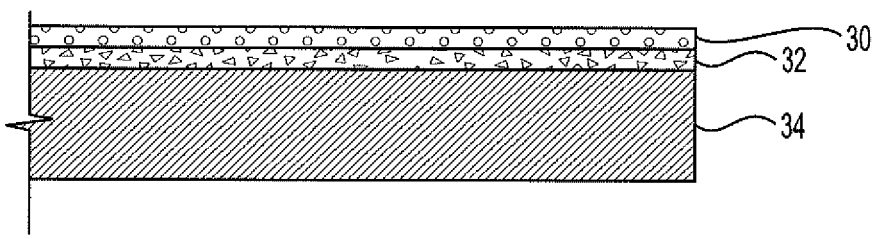
FIG. 3 is a side, cross-sectional view of a wall of a paper cup showing two coating layers, one layer of primer coating and the outside layer of styrene acrylic copolymer.

FIG. 3 is a side, cross-sectional view of a paper sidewall or bottom where the paper substrate 34 has two coatings on it to seal the paper. The inside coating 32 is a primer coating that may be a primer composition such as polyvinyl alcohol or other specific primer as described earlier herein. Alternatively, this inside coating layer 32 may be a layer of styrene acrylic copolymer as also described herein. The selection of a particular inside layer is aimed at smoothing the surface of the paper substrate 34 so that the outside layer 30 of styrene acrylic copolymer will reasonably complete the seal of the paper substrate 34 surface. For instance, the paper substrate 34 may be a kraft linerboard material. Kraft linerboard paper surface is known as a rough surface. A primer layer is needed to smooth the surface of a kraft linerboard before coating with a final coating of styrene acrylic copolymer.

Figure 4:
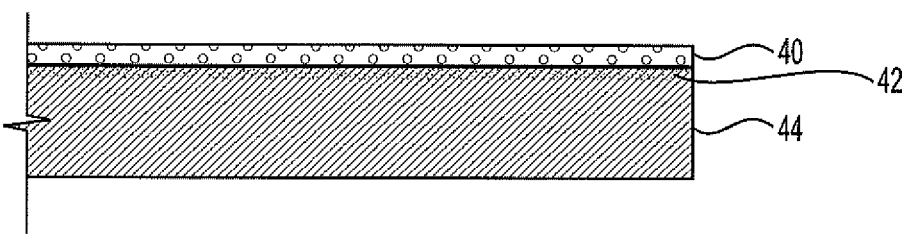
FIG. 4 is a side, cross-sectional view of a wall of a paper cup showing a single coating layer of styrene acrylic copolymer on a calendared paper substrate.

FIG. 4 is a side, cross-sectional view of a paper sidewall or bottom where the paper substrate 44 has a smoothed surface 42. The smoothed surface 42 has been mechanically pressed in a calendaring process to create the smooth feature of the paper substrate 44. Because of this smooth surface 42, a significantly lower coat wgt, layer 40 of styrene acrylic copolymer is needed to seal the paper substrate 44. For instance, a kraft linerboard substrate may be calendared to smooth the surface of the otherwise rough paper substrate so that a lower coating weight and perhaps only one coating layer is required.

Figure 5:
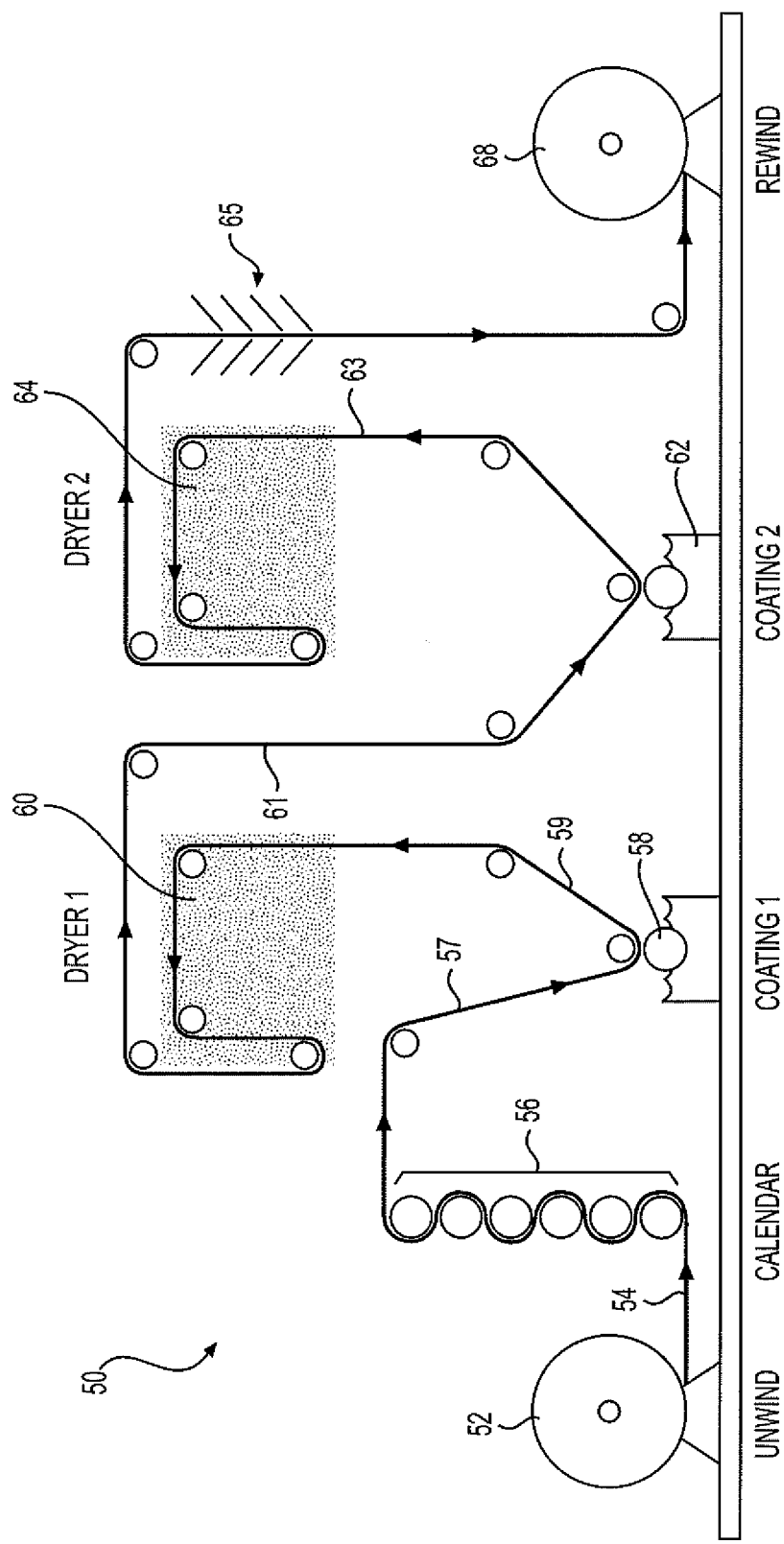
FIG. 5 is a schematic view of a hot drink cup paper coating process.

FIG. 5 is a schematic representation of a coating process 50 to form the coated paper as described herein. The process 50 begins at the unwind roller 52. The unwind roller 52 unwinds a web substrate of plain, uncoated paper 54. This uncoated paper 54 is fed through calendaring rolls 56 which compress the paper between the calendaring rolls in order to smooth the surface of the uncoated paper. This calendaring process is described earlier herein. The calendared paper 57 is then fed through a coating machine 58. This coating machine 58 may either be applying the styrene acrylic copolymer emulsion, or it may apply a primer coating. If the coating machine 58 applies styrene acrylic copolymer, and if the paper is to be coated with only a single coat of styrene acrylic copolymer, then the coating process is complete. This single-coated paper 59 will proceed to the drying section where it is cured onto the paper substrate. This coated and dried paper 61 may then go directly to the rewind roller 68. (This single coating process is not shown, but it is easily seen by just bypassing the second coating and drying section.) What is shown in FIG. 5 is a two-coating process where the single-coated or primed paper 61 is fed through a second coater 62 to form a twice-coated paper 63. This twice-coated paper 63 is then sent through a second dryer 64 to cure the second coat onto the paper substrate to form the twice-coated and cured paper that then passes through a moisturizer 65. The coated paper 63 is subsequently rewound onto a coated roll 68.

Figure 6:
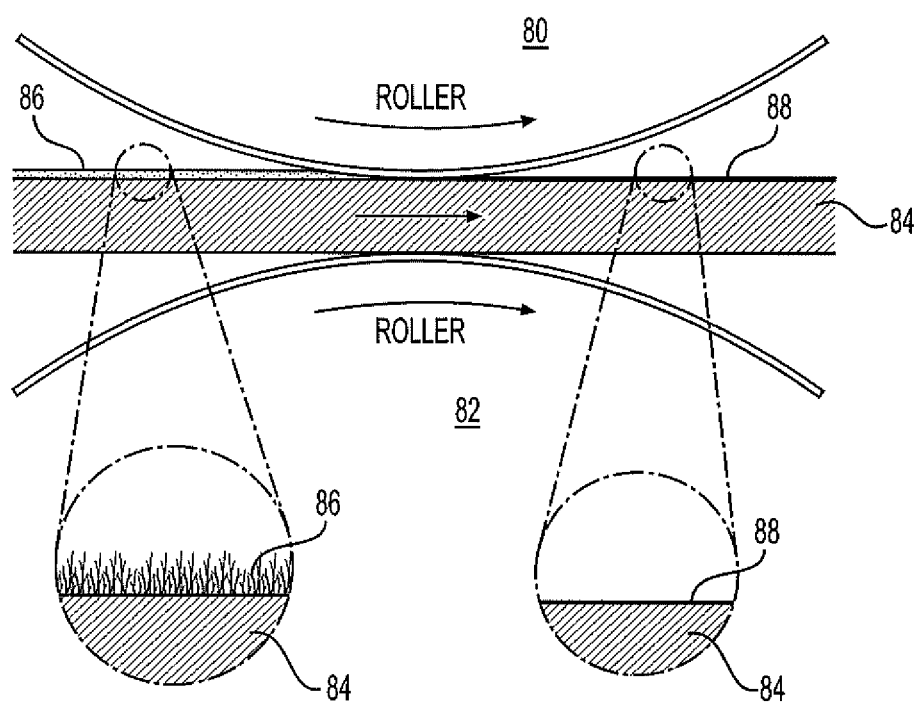
FIG. 6 is a close-up side view of paper before and after the calendaring process.

FIG. 6 illustrates a more close-up view of how the calendaring process smooths a paper substrate surface. A paper substrate 84 is shown passing between rollers 80 and 82. The rollers 80 and 82 may be both metal, rubber-coated, or one of each. The rollers 80 and 82 may be heated or chilled depending on the purpose of their use. The distance between the rollers 80 and 82 may be varied depending on the thickness of the paper 84 and the desired density or smoothness of the paper 84 surface. In FIG. 6, the paper 84 has a rough surface 86. As can be seen best in the closeup, the surface 86 is rough and can have fibers sticking upwardly from the surface. The paper 84 is then passed between the rollers 80 and 82 under pressure and optionally heat. The smooth surface 88 of the paper 84 emerges from between the rollers. The smoothness of the smooth surface 88 can be visually seen as compared with the previous roughness of the rough surface 86 before the rollers. The smooth surface 88 may be more effectively and economically coated in the subsequent coating steps as described herein.

EXAMPLE

A hot drink cup paper stock was manufactured in the following way. The initial paperboard stock is a solid bleached sulfate (SBS) paperboard. For a 12-oz. cup, a 0.013" stock is used for the bottom of the cup. A 0.016" stock is used for the sidewall of the cup. The SBS stock, whether sidewall or bottom of the cup, is then run through a coating line as described in connection with FIG. 5.

In the example of the sidewall stock, the finished stock will have a basis weight of 52 to 73 pounds per thousand square feet according to the TAPPI T-410 method. The stock will be 13-18 mils thick according to the TAPPI T-411 method. The stock will have a moisture content of 5 to 9% by weight, and will have a Cobb water resistance of 5 to 35 g/m2 according to the TAPPI T-441 method. The moisture content facilitates the later processing of the stock into the cup form.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A repulpable, moisture resistant hot drink cup comprising:
a paper cup comprising a paper bottom and a paper sidewall and having an inside surface of the cup defined by an inside surface of the bottom and an inside surface of the sidewall,
wherein the paper that forms the bottom and the sidewall is impregnated with sizing in an amount that a 30-minute Cobb value of an uncoated paper cup formed from the paper is about 400 gm/m2 or less, and the paper does not have any petroleum-based polymer incorporated in it,
and wherein the inside surface of the cup is coated with an emulsified mixture of styrene acrylic copolymer to provide a moisture resistance to the inside of the paper cup,
and further wherein the coating contains no hydrogenated triglyceride material.

2. A repulpable, moisture resistant hot drink cup as described in claim 1,
wherein the bottom and sidewall are impregnated with sizing in an amount that the 10-minute Cobb value of an uncoated paper cup is about 200 gm/m2 or less.

3. A repulpable, moisture resistant hot drink cup as described in claim 1,
wherein the bottom and sidewall are impregnated with sizing in an amount that the 10-minute Cobb value of an uncoated paper cup is about 100 gm/m2 or less.

4. A repulpable, moisture resistant hot drink cup as described in claim 1,
wherein the solids content of the styrene acrylic copolymer emulsion is about 30% to 70%.

5. A repulpable, moisture resistant hot drink cup as described in claim 1,
wherein the solids content of the styrene acrylic copolymer emulsion is about 45% to 55%.

6. A repulpable, moisture resistant hot drink cup as described in claim 1,
wherein the solids content of the styrene acrylic copolymer emulsion is about 50%.

7. A repulpable, moisture resistant hot drink cup as described in claim 1, wherein the coated cup has a 10-minute Cobb value of about 5 gm/m2 or less.

8. A repulpable, moisture resistant hot drink cup as described in claim 1,
wherein the coated cup has a 10-minute Cobb value of about 4 gm/m2 or less.

9. A repulpable, moisture resistant hot drink cup as described in claim 1,
wherein the coated cup has a 10-minute Cobb value of about 3 gm/m2 or less.

10. A repulpable, moisture resistant hot drink cup as described in claim 1,
further comprising a primer coating on the inside surface between the inside surface of the cup and the styrene acrylic copolymer coating layer, and wherein the primer coating is an polyvinyl alcohol.

11. A repulpable, moisture resistant hot drink cup as described in claim 1,
wherein the styrene acrylic copolymer has a Tg of −10 to 40 degrees.

12. A repulpable, moisture resistant hot drink cup as described in claim 1,
wherein the styrene acrylic copolymer has a Tg of 0 to 10 degrees.

13. A repulpable, moisture resistant hot drink cup as described in claim 1,
wherein the styrene acrylic copolymer has a Tg of about 7 degrees.

14. A repulpable, moisture resistant hot drink cup as described in claim 1,
wherein the paper stock that forms the bottom and the sidewall of the cup is calendared by passing between two rollers prior to being formed as the bottom and sidewall of the paper cup.

* * * * *